(12) United States Patent
Shono

(10) Patent No.: US 8,664,927 B2
(45) Date of Patent: Mar. 4, 2014

(54) VOLTAGE REGULATOR

(75) Inventor: Ken Shono, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 149 days.

(21) Appl. No.: 13/427,530

(22) Filed: Mar. 22, 2012

(65) Prior Publication Data

US 2012/0306469 A1 Dec. 6, 2012

(30) Foreign Application Priority Data

May 31, 2011 (JP) ................... 2011-121686

(51) Int. Cl.
*G05F 1/40* (2006.01)
(52) U.S. Cl.
USPC ....................................................... 323/282
(58) Field of Classification Search
USPC .......... 323/265, 268, 273, 280, 281, 282, 351
See application file for complete search history.

(56) References Cited

U.S. PATENT DOCUMENTS

| | | | | |
|---|---|---|---|---|
| 4,471,289 A | * | 9/1984 | Duley et al. | 323/222 |
| 5,027,266 A | * | 6/1991 | Ishii et al. | 363/63 |
| 6,661,210 B2 | * | 12/2003 | Kimball et al. | 323/268 |
| 7,733,126 B1 | * | 6/2010 | Choy et al. | 326/68 |
| 8,330,519 B2 | * | 12/2012 | Lam et al. | 327/308 |
| 2013/0076322 A1 | * | 3/2013 | Tateno et al. | 323/271 |

FOREIGN PATENT DOCUMENTS

| | | |
|---|---|---|
| JP | 2004-173354 A | 6/2004 |
| JP | 2008-235952 A | 10/2008 |

* cited by examiner

*Primary Examiner* — Adolf Berhane
(74) *Attorney, Agent, or Firm* — Arent Fox LLP (57) ABSTRACT

A voltage regulator includes: a normally-on first transistor coupled to an input voltage; an inductor provided between the first transistor and an output terminal; a return circuit provided between a reference voltage and a connection node of the first transistor and the inductor; a drive circuit that supplies a drive signal to a gate of the first transistor; and a negative voltage generation circuit that is coupled to the reference voltage, generates a negative voltage on the basis of a pulse signal generated at the connection node by switching operation of the first transistor, and supplies the negative voltage to the drive circuit.

19 Claims, 8 Drawing Sheets

VOLTAGE REGULATOR

CROSS-REFERENCE TO RELATED APPLICATION

This application is based upon and claims the benefit of priority of the prior Japanese Patent Application No. 2011-121686, filed on May 31, 2011, the entire contents of which are incorporated herein by reference.

FIELD

The embodiments relate to a voltage regulator.

BACKGROUND

A voltage regulator is a power supply circuit that generates voltage of a desired potential from DC or AC power supply. Voltage regulators have been widely used as circuits for supplying an optimum power supply voltage to various electronic devices.

Switching regulators using transistors made of semiconductors having a wide band gap, such as GaN and SiC, have recently attracted attention. Since these semiconductors have a band gap wider and a breakthrough voltage higher than those of Si, a high voltage can be applied to a transistor of a smaller size, and these semiconductors are expected to be used as high-speed switching elements with a high breakthrough voltage for voltage regulators.

Such a voltage regulator is disclosed in Japanese Patent Application Publication No. 2008-235952.

SUMMARY

A voltage regulator includes: a normally-on first transistor coupled to an input voltage; an inductor provided between the first transistor and an output terminal; a return circuit provided between a reference voltage and a connection node of the first transistor and the inductor; a drive circuit that supplies a drive signal to a gate of the first transistor; and a negative voltage generation circuit that is coupled to the reference voltage, generates a negative voltage on the basis of a pulse signal generated at the connection node by switching operation of the first transistor, and supplies the negative voltage to the drive circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Since GaN HEMTs (high electron mobility transistors) are also suitable for high-speed switching and have a high breakthrough voltage, they have attracted attention as switching elements for switching regulators. However, the conventional silicon power MOSFET is of a normally-off type (enhancement type), that is, normally-off in a state in which no voltage is applied to the gate, whereas a GaN HEMT is of a normally-on type (depletion type), that is, normally-on in a state in which no voltage is applied to the gate. Therefore, a negative power supply is necessary to switch the HEMT. Providing a voltage regulator with a negative power supply is undesirable because it results in increased cost. At least one of the above-described problems is solved by the embodiments of the following detailed description.

Figure 1:
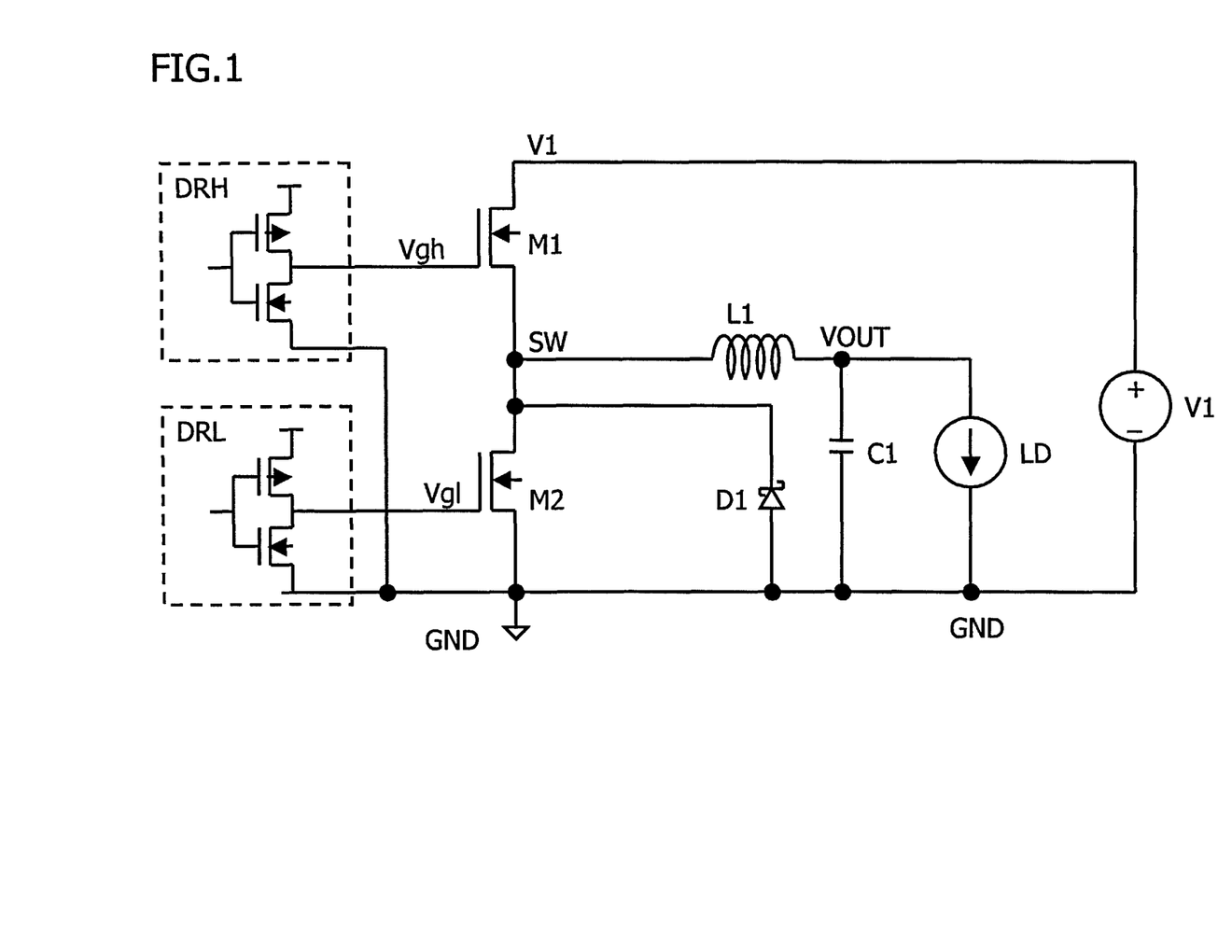
FIG. 1 illustrates an example of a step-down voltage regulator.

FIG. 1 illustrates an example of a step-down voltage regulator. This voltage regulator reduces the input voltage V1 and generates an output voltage VOUT of a desired potential, and this output voltage VOUT is supplied to a load circuit LD.

This voltage regulator has a high-side first transistor M1 coupled to the input voltage V1, a low-side second transistor M2 coupled to a ground voltage GND, an inductor L1 provided between the output terminal (VOUT) and a connection node SW of the two transistors M1, M2, and a capacitor C1 provided between the output terminal and the ground voltage GND. Further, a Schottky diode D1 is provided in parallel with the second transistor M2.

The voltage regulator has drive circuits DRH, DRL that supply drive signals to the gate of the first transistor M1 and the gate of the second transistor M2. These drive circuits generate pulse drive signals Vgh, Vgl that on/off drive the first and second transistors M1, M2 in response to control signals from a control circuit (not shown in the figure).

The first and second transistors M1, M2 are driven so as to be switched on/off alternately. Where the first transistor M1 is on, the input voltage V1 causes an electric current to flow in the path of the transistor M1, inductor L1, and load circuit LD, and electromagnetic energy is accumulated in the inductor L1. Meanwhile, where the first transistor M1 is switched off, the second transistor M2 is switched on and a return current flows in the path of the inductor L1, load circuit LD, and transistor M2. Where the two transistors M1, M2 are on at the same time, an unnecessary through current flows. Therefore, a dead time in which the two transistors are switched off is present when the two transistors are switched on/off. The Schottky diode D1 becomes conductive within this dead time interval.

The ratio of the time interval in which the first transistor M1 is on is called a duty ratio, and the electric potential of the output voltage VOUT is obtained by multiplying the input voltage V1 by the duty ratio.

When the first and second transistors M1, M2 are silicon power MOS transistors, the power MOS transistor is typically of a normally-off type such that the transistor is off when no voltage is applied to the gate. This is because with a normally-off type, the drive circuits DRH, DRL can drive the two transistors on/off by setting the potential of the drive pulse signals Vgh, Vgl to a ground voltage and a high voltage exceeding the threshold voltage of the two transistors.

However, where the first and second transistors M1, M2 are HEMTs (High Electron Mobility Transistors) made of a compound semiconductor, since the HEMTs are usually of a normally-on type, the transistors M1, M2 cannot be switched off by the drive pulse signals Vgh, Vgl having a clamp voltage and a voltage higher than the ground voltage. For this reason, when normally-on transistors M1, M2 are used, the gate drive signal should be set to a negative potential to switch the transistors off and a negative power supply should be provided. Where such a negative power supply is provided, the cost is raised since the number of components is increased.

First Embodiment, Step-Down Regulator

Figure 2:
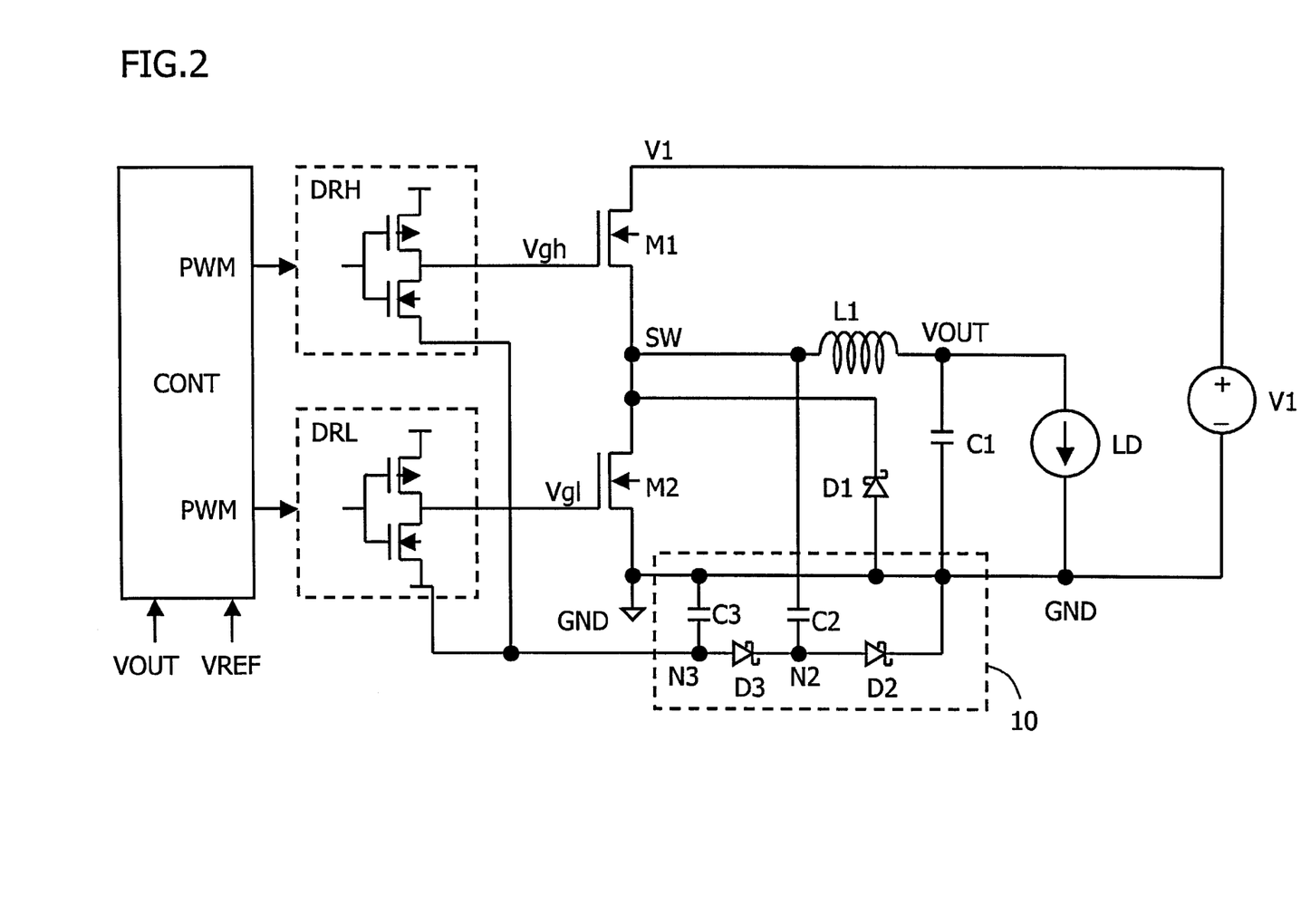
FIG. 2 is a circuit diagram of a step-down voltage regulator of the first embodiment.

FIG. 2 is a circuit diagram of a step-down voltage regulator of the first embodiment. The voltage regulator depicted in FIG. 2 generates an output voltage VOUT of a desired potential by lowering the input voltage V1 in the same manner as depicted in FIG. 1. Further, the voltage regulator illustrated by FIG. 2 is provided with a high-side first transistor M1 coupled or coupled to the input voltage V1, a low-side second transistor M2 coupled or coupled to a ground voltage GND, a reference voltage, an inductor L1 provided between an output terminal (VOUT) and a connection node SW of the two transistors M1, M2, and a capacitor C1 provided between the output terminal and the ground voltage GND. A Schottky diode D1 is also provided in parallel with the second transistor M2.

By contrast with the circuit illustrated by FIG. 1, the first and second transistors M1, M2 are HEMTs made of a compound semiconductor with a broad band gap, such as GaN, which have a high breakthrough voltage and are suitable for high-speed switching. However, either or both of the second transistor M2 and the Schottky diode D1 is provided.

Further, the voltage regulator depicted in FIG. 2 has drive circuits DRH, DRL which supply drive signals to the gate of the first transistor M1 and the gate of the second transistor M2. The drive circuits generate pulse drive signals Vgh, Vgl that on/off drive the first and second transistors M1, M2 in response to a control signal PWM generated by a control circuit CONT such that the output voltage VOUT becomes the desired voltage VREF.

Since the first and second transistors M1, M2 are normally-on transistors, the drive circuit DRH, DRL generate drive signals Vgh, Vgl having a negative voltage that switches the transistors off and a voltage that switches the transistors on. For this reason, the voltage regulator depicted in the FIG. 2 has a negative voltage generation circuit 10 that is coupled or coupled to the ground voltage GND and generates a negative voltage on the basis of the pulse signal generated at the connection node SW of the first transistor M1 and the inductor L1. The negative voltage generation circuit 10 supplies the negative voltage generated at the node N3 to the drive circuits DRH, DRL, and the drive circuits DRH, DRL generate drive signals Vgh, Vgl having an ON voltage that switches on the transistors M1, M2 and a negative OFF voltage that switches off them. The drive circuits depicted in FIG. 2 have a CMOS inverter in the very last stage and use a negative voltage generated by the negative voltage generation circuit 10 for a low power supply of the CMOS inverter.

In the voltage regulator depicted in FIG. 2, the first and second transistors M1, M2 are also driven so as to be switched on/off alternately in the same manner as in the voltage regulator depicted in FIG. 1. Where the first transistor M1 is switched on, the current flows from the input voltage V1 through the path of the transistor M1, inductor L1, and load circuit LD and electromagnetic energy is accumulated in the inductor L1. Meanwhile, where the first transistor M1 is switched off, the second transistor M2 becomes on, and the return current flows in the path of the second transistor M2, the inductor L1, load circuit LD, and transistor M2. Further, since an unnecessary through current flows when the two transistors M1, M2 are simultaneously switched on, there is a dead time in which the two transistors are off when the two transistors are switched on/off. The Schottky diode D1 is conductive within the dead time to prevent the decrease in efficiency.

The second transistor M2 and the Schottky diode D1 are return circuits in which a return current flows, and it is possible to use either thereof. In the case of a circuit including the Schottky diode D1, a return current flows in the Schottky diode D1 when the first transistor M1 is off. In the case of a circuit including the second transistor M2, the second transistor M2 is switched on when the first transistor is off, and a return current flows in the second transistor M2. However, no return current flows within the dead time. Where both the second transistor M2 and the Schottky diode D1 are present, when the first transistor is off, a through current also flows within the dead time and the efficiency of the voltage regulator is increased. Since a voltage drop on the transistor M2 is less than that on the Schottky diode D1, the highest increase in efficiency can be obtained.

The negative voltage generation circuit 10 is a pumping circuit that uses pulse signals generated at the connection node SW by the first and second transistors M1, M2 with a high drive capacity. The voltage on the connection node SW rises to the input voltage V1 when the first transistor M1 is on and drops to the ground voltage when the first transistor M1 is off and the second transistor M2 is on.

The negative voltage generation circuit 10 includes a first capacitor C2 coupled at one terminal to the connection node SW, a second capacitor C3 coupled at one terminal to the ground voltage GND, a first unidirectional element D2 provided between the other terminal N2 of the first capacitor C2 and the ground voltage GND, and a second unidirectional element D3 provided between the other terminal N3 of the second capacitor C3 and the other terminal N2 of the first capacitor C2. A negative voltage is generated at the other terminal N3 of the second capacitor C3. In the example depicted in FIG. 2, the first and second unidirectional elements D2, D3 are Schottky diodes.

Figure 3:
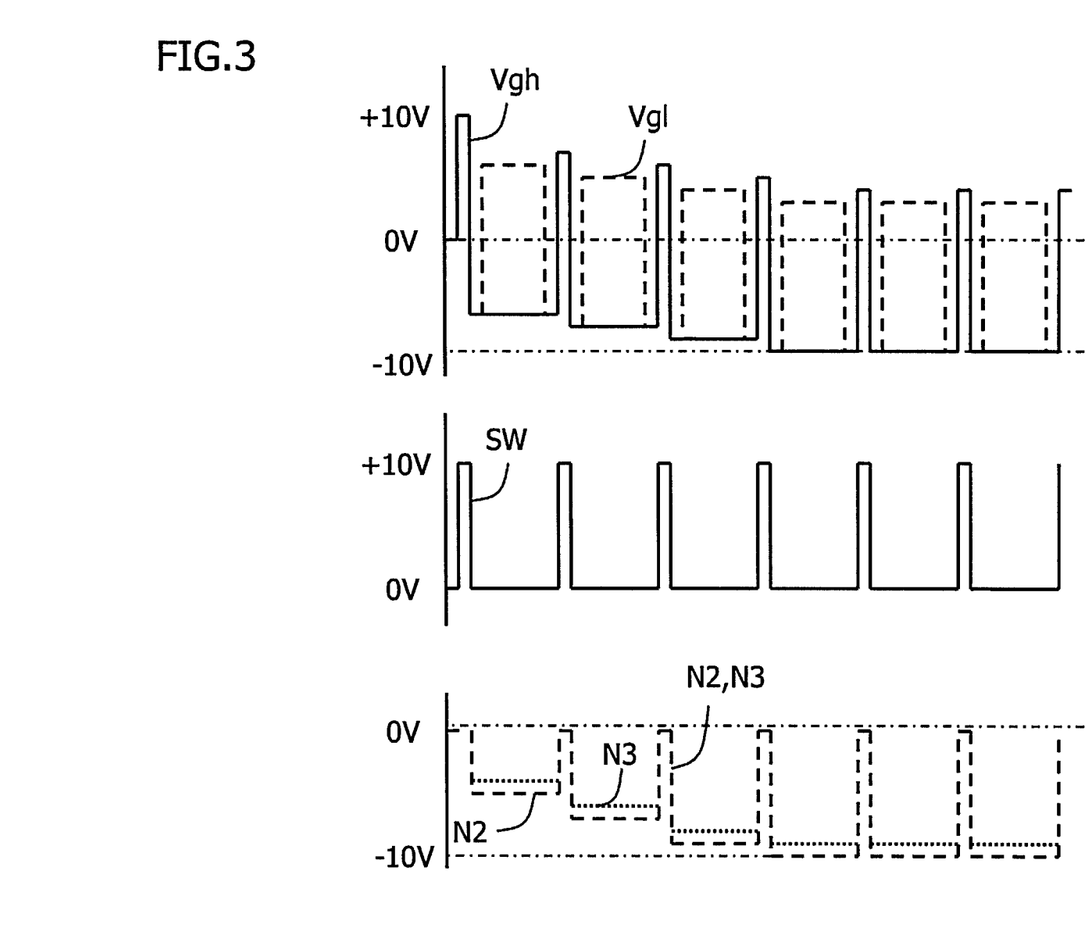
FIG. 3 is a voltage waveform diagram illustrating the operation of the negative voltage generation circuit.

FIG. 3 is a voltage waveform diagram illustrating the operation of the negative voltage generation circuit. In this example, the input voltage V1 is for example 10 V, and the threshold voltage of the HEMT constituting the first and second transistors is for example −2 V to −3 V. The forward voltage of the Schottky diode D1 is for example about 0.4 V.

The operation of the negative voltage generation circuit 10 will be explained hereinbelow with reference to FIG. 3. When the operation is started, the nodes N2, N3 in the negative voltage generation circuit 10 are initially at the ground voltage (0 V). Accordingly, where the high-side drive signal Vgh is at a H level (10 V), the low-side drive signal Vgl is at a L level, the first transistor M1 is on, and the second transistor M2 is off (or on if Vgl is 0 V), the voltage at the connection node SW rises to about 10 V. Meanwhile, where the high-side drive signal Vgh is at a L level, the low-side drive signal Vgl is at a H level, the first transistor M1 is off (or on if Vgh is 0V), and the second transistor M2 is on, the voltage at the connection node SW drops to the ground voltage (0 V).

Thus, the on/off operation of the first and second transistors M1, M2 produces a pulse signal that repeatedly alternates between a value close to 10 V and 0 V at the connection node SW. Where the connection node SW is at a high potential, the capacitor C2 is charged, and where the connection node SW is at 0 V, the potential of the node N2 becomes negative due to coupling of the capacitor C2. As a consequence, the diode D3 is switched on, the potential of the node N3 also becomes negative, and the capacitor C3 is charged at a negative potential.

Where the connection node SW again assumes a high potential, the coupling of the capacitor C2 acts to raise the potential of the node N2, but the diode D2 prevents the potential from rising above the potential obtained by adding the forward voltage of the diode D2 to the ground voltage. Where the voltage of the connection node SW thereafter drops to 0 V, the potential of the node N2 assumes an even deeper negative potential due to the coupling of the capacitor C2, the node N3 also assumes an even deeper negative potential via the diode D3, and the capacitor C3 is charged.

As explained above, where the connection node SW assumes a high potential, the capacitor C2 is charged, and where the connection node SW assumes a ground potential, the electric charge that has been charged to the capacitor C2 is transferred to the capacitor C3, and the potential of the node N3 decreases to an even deeper negative potential. Where such pumping action is repeated, the potentials of the nodes N2, N3 gradually decrease to a deep negative potential and finally decrease to a value close to −10 V. Furthermore, the variation in the potential of the node N2 is further smoothed out by the capacitor C3 and the variation in the potential of the node N3 decreases.

The negative voltage generated at the node N3 is supplied as a low-side power supply of the drive circuits DRH, DRL. Therefore, the low-side potentials of the drive signals Vgh, Vgl finally also decrease to a negative potential close to −10 V, the normally-on first and second transistors M1, M2 having a negative threshold voltage are reliably switched off, and the abovementioned pumping action is realized.

The lower the forward voltage of diodes D2, D3 is, the higher the efficiency of the negative voltage generation circuit is. Therefore, Schottky diodes, which have a forward voltage lower than that of PN-junction diodes, are preferred.

The connection node SW is driven at a high potential by the first transistor M1 with a high drive performance, and a large current is supplied to the inductor I1. Therefore, by using a pulse signal of the connection node SW with high drive performance, the negative voltage generation circuit 10 generates at the node N3 the desired negative voltage.

Figure 4:
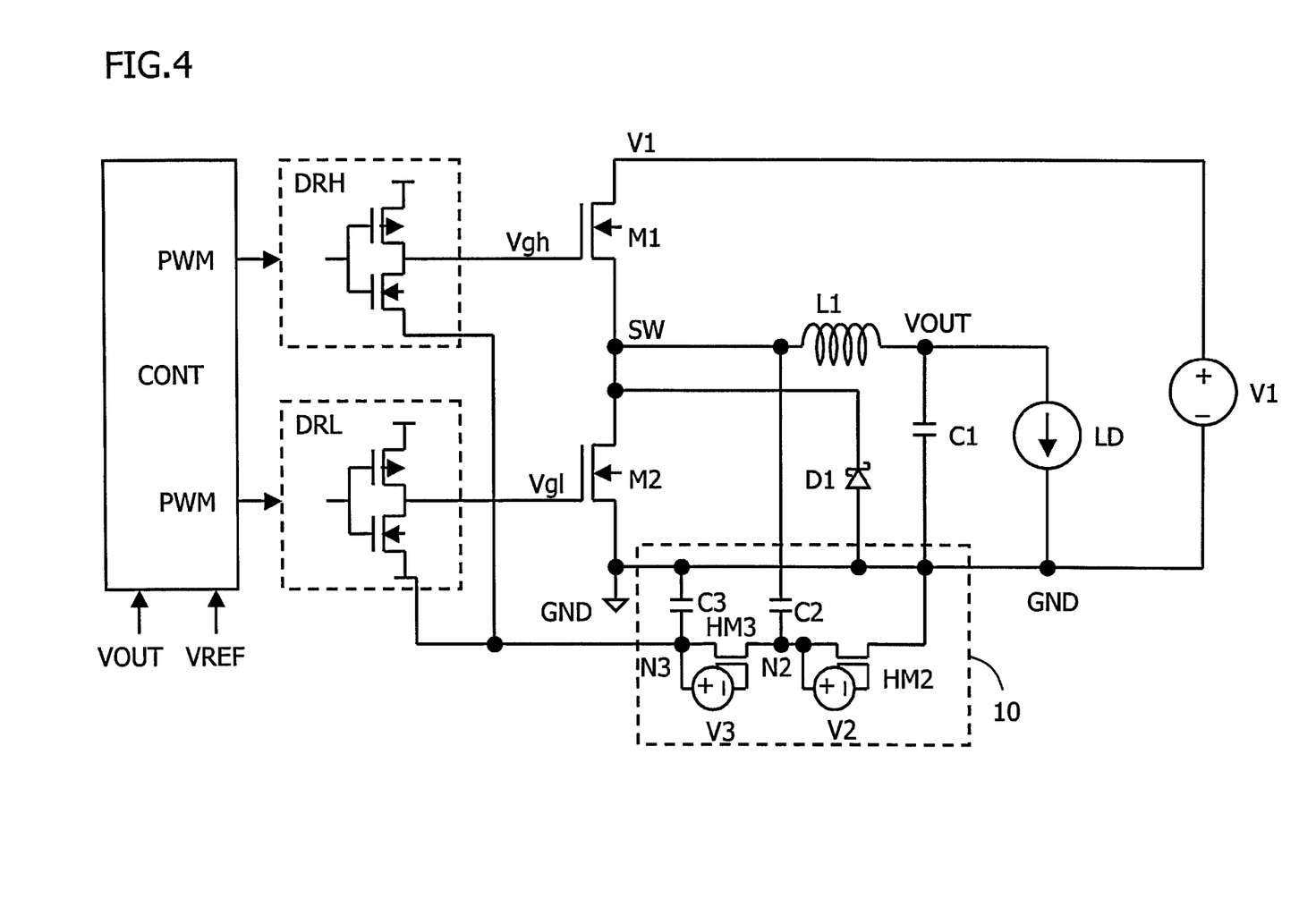
FIG. 4 shows Variation Example 1 of the step-down voltage regulator of the first embodiment.

FIG. 4 shows Variation Example 1 of the step-down voltage regulator of the first embodiment. By contrast with the voltage regulator shown in FIG. 2, the unidirectional elements in the negative voltage generation circuit 10 are normally-on compound semiconductor high electron mobility transistors (HEMT) HM2, HM3 in which constant voltage generation circuits V2, V3 are provided between a gate and a drain. Thus, the constant voltage source V2 is provided between the gate and the drain (N2) of the HEMT (HM2), and when the drain (N2) is at a ground potential, the gate is set by the constant voltage source V2 to a potential that is lower than the ground potential by a voltage equal to or higher than the threshold voltage (negative voltage) and the HEMT (HM2) assumes an off state. Where the potential of the drain (N2) rises and the gate voltage exceeds the threshold voltage (negative voltage), the current flows from the drain (N2) to the source (ground voltage GND). The same is true for the HEMT (HM3). Where the threshold of the normally-on HEMT is for example −2 V to −3 V, the constant voltage sources V2, V3 are set to 1.98 V to 2.98 V.

In the example shown in FIG. 4, the first and second transistors M1, M2 that are required to have a strong current drive capability are HEMTs with a large gate width, and the transistors HM2, HM3 in the negative voltage generation circuit 10 that are not required to have such strong current drive capability are HEMTs with a small gate width. All the transistors are of a normally-on type. These HEMTs are desirably formed within the same semiconductor chip.

Meanwhile the drive circuits DRH, DRL and control circuit CONT are preferably constituted by integrated circuits formed in a silicon chip.

Figure 5:
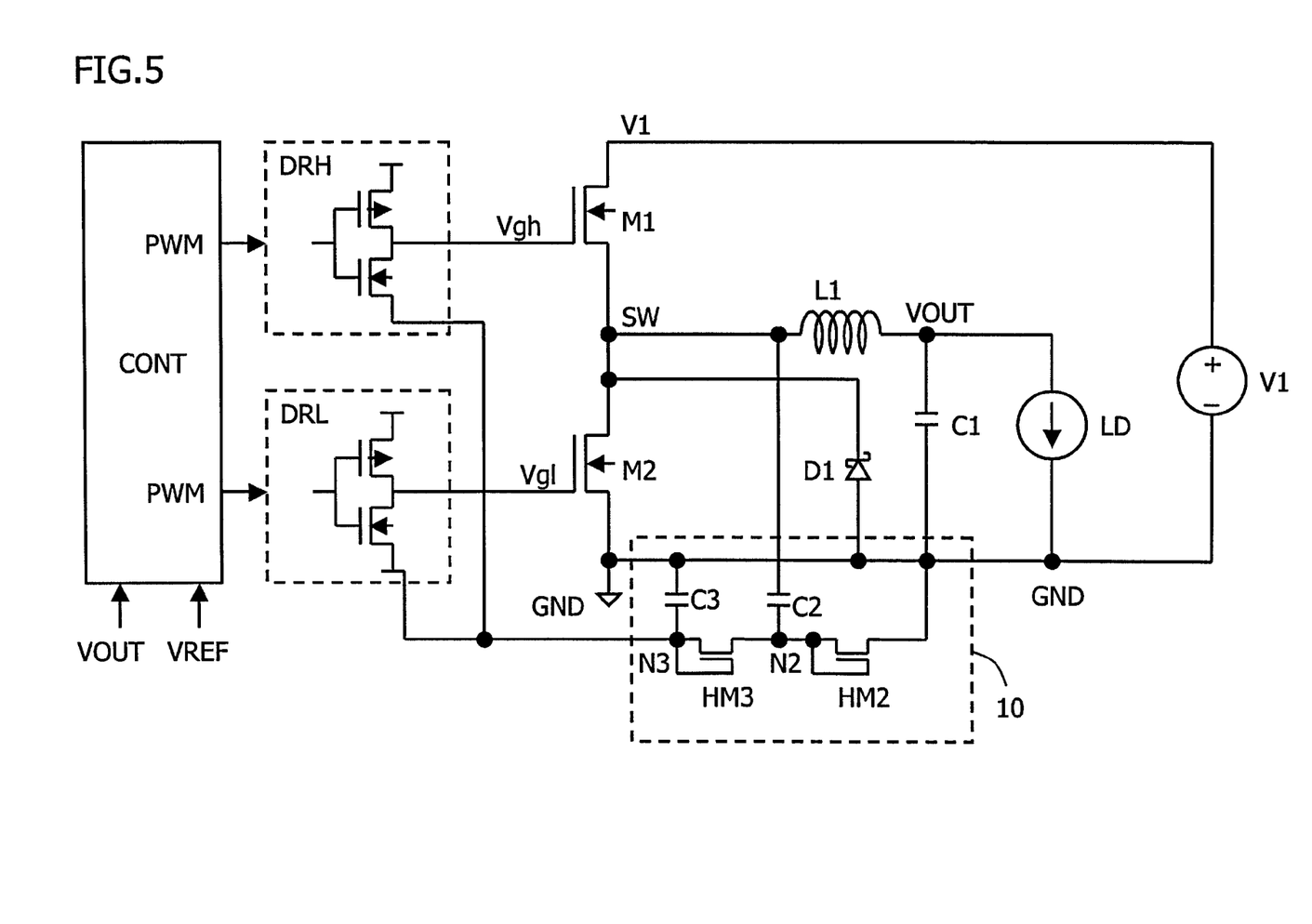
FIG. 5 illustrates Variation Example 2 of the step-down voltage regulator in the first embodiment.

FIG. 5 illustrates Variation Example 2 of the step-down voltage regulator in the first embodiment. By contrast with the voltage regulator shown in FIG. 2, the unidirectional elements in the negative voltage generation circuit 10 are normally-off (enhancement type) compound semiconductor high electron mobility transistors (HEMT) HM2, HM3 in which gates and drains are coupled to each other. In the case of HEMT (HM2), the HEMT (HM2) is conductive when the potential of the drain (N2) is higher by a threshold voltage, for example equal to or higher than +1.5 V, than the ground potential GND. The same is true for the HEMT (HM3).

Figure 6:
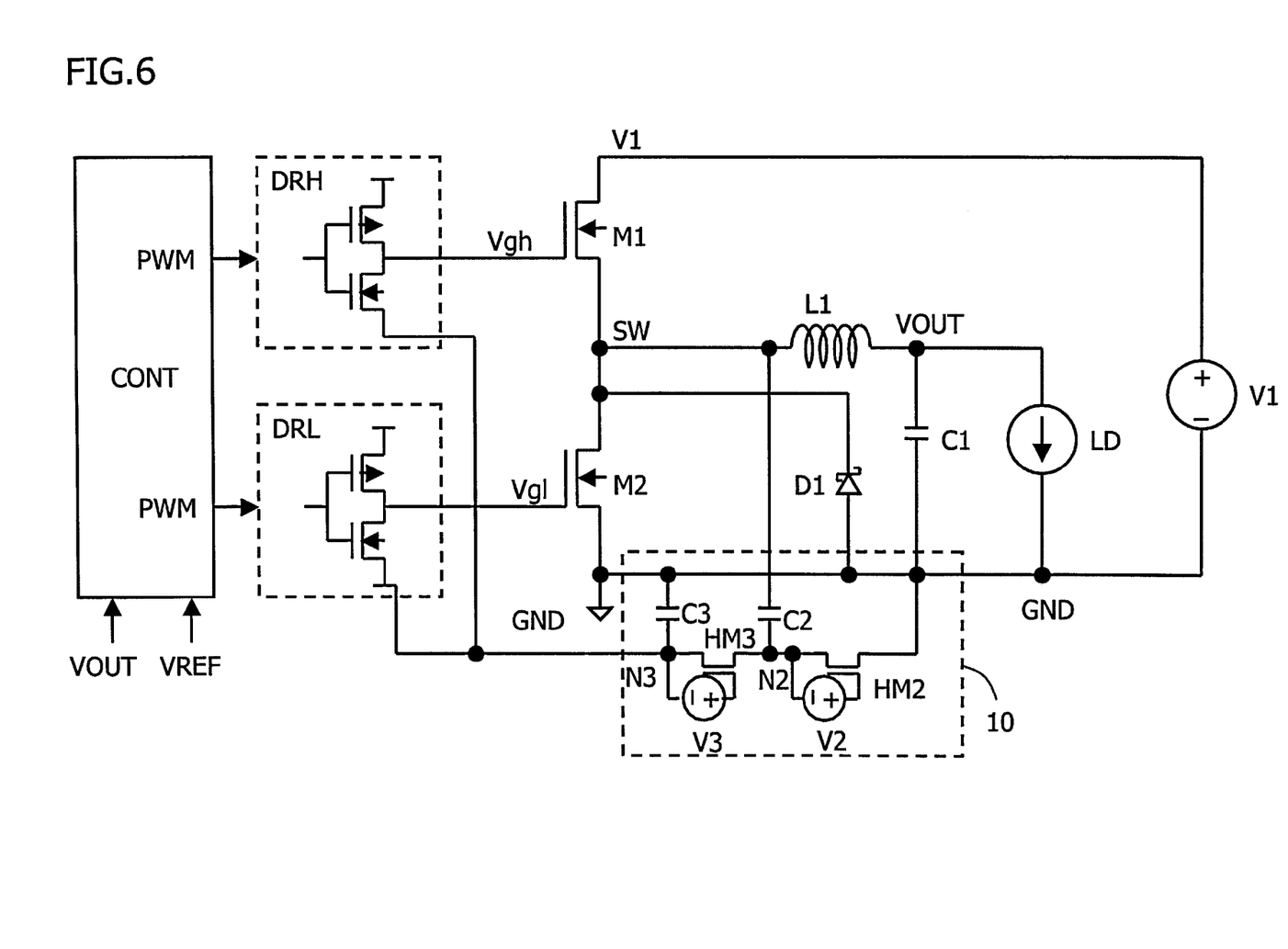
FIG. 6 illustrates Variation Example 3 of the step-down voltage regulator in the first embodiment.

FIG. 6 illustrates Variation Example 3 of the step-down voltage regulator in the first embodiment. By contrast with the voltage regulator shown in FIG. 5, the unidirectional elements in the negative voltage generation circuit 10 are normally-off compound semiconductor high electron mobility transistors (HEMT) HM2, HM3 in which constant voltage generation circuits V2, V3 are provided between a gate and a drain. The constant voltage V2, V3 is set to a positive threshold voltage of the HEMT (HM2, HM3), for example, a voltage slightly lower than 1.5 V, for example, to 1.48 V. The polarity of the constant voltage V2, V3 is reversed with respect to that presented in FIG. 4.

As a result, in the case of HEMT (HM2), where the potential of the drain (N2) is higher, although by a small amount, than the ground potential GND of the source, the potential of the gate becomes higher than the ground potential of the source by a voltage equal to or higher than the threshold voltage, and the HEMT (HM2) is conductive. The same is true for the HEMT (HM3).

As will be described hereinbelow, the unidirectional elements based on HEMT that are depicted in FIGS. 4, 5, and 6 do not have a body diode inside a substrate, as in Si power MOS transistors. Therefore, the HEMT (HM2) functions as a unidirectional element in which no current flows to the drain (N2) from the source coupled to the ground GND.

Second Embodiment, Step-Up Voltage Regulator

Figure 7:
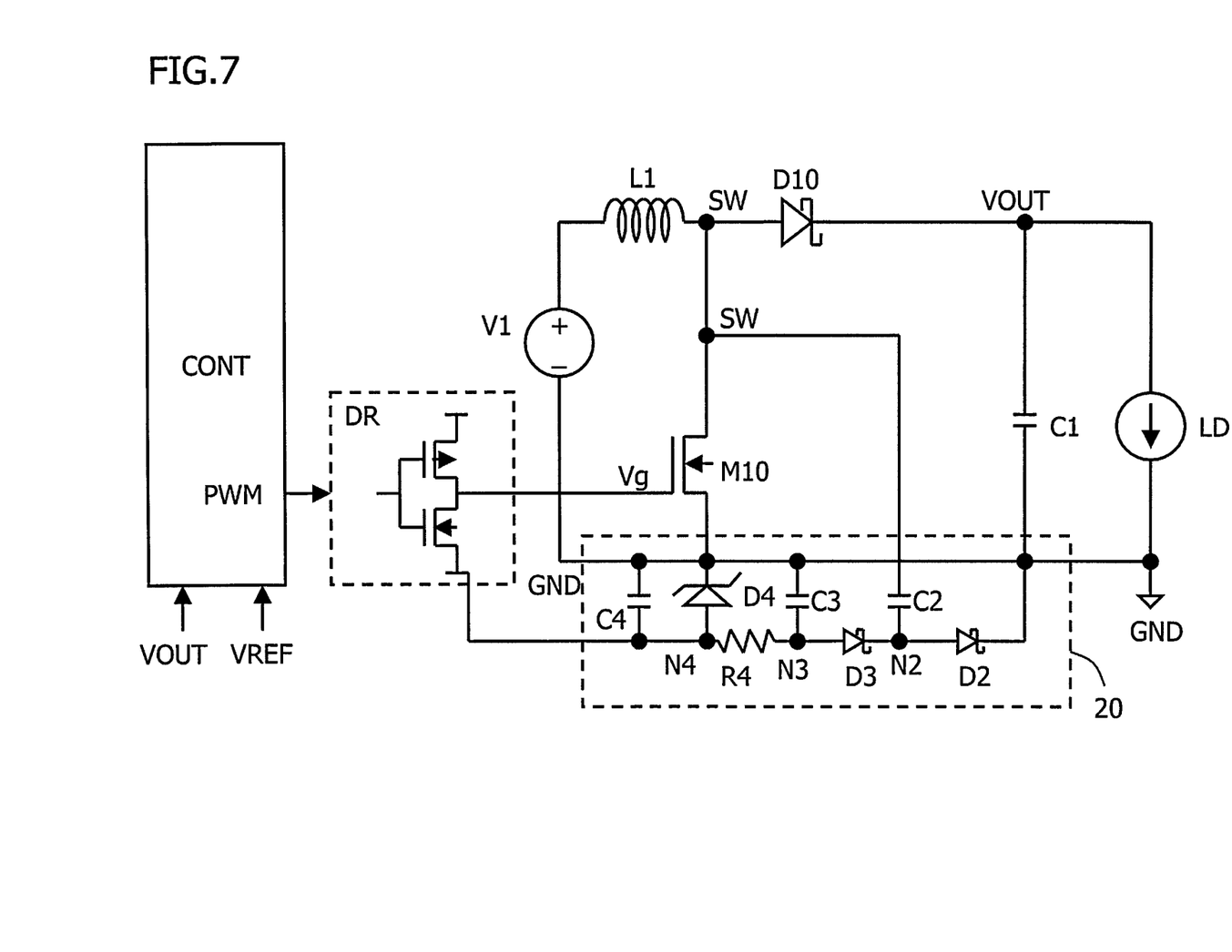
FIG. 7 is a circuit diagram of a step-up voltage regulator of the second embodiment.

FIG. 7 is a circuit diagram of a step-up voltage regulator of the second embodiment. The voltage regulator depicted in FIG. 7 raises generates an output voltage VOUT of a desired high potential higher than an input voltage V1.

The voltage regulator depicted in FIG. 7 includes an inductor L10 coupled to the input voltage V1, a unidirectional output element D10 provided between the inductor L10 and an output terminal VOUT, a normally-on first transistor M10 provided between a ground voltage GND and a connection node SW between the inductor L10 and the unidirectional output element D10, and a drive circuit DR that supplies a drive signal Vg to the gate of the first transistor M10. The first transistor M10 is, for example, a normally-on HEMT. Accordingly, in order to set the drive signal Vg that drives the first transistor M10 to a negative potential, the voltage regulator includes a negative voltage generation circuit 20 that is coupled to the ground voltage GND, generates a negative voltage on the basis of pulsed signals generated at the connection node SW by on/off operation of the first transistor M10, and supplies the negative voltage to the drive circuit DR.

Similarly to the negative voltage generation circuit 10 in FIG. 2, the negative voltage generation circuit 20 includes a first capacitor C2 with one terminal coupled to the connection node SW, a second capacitor C3 with one terminal coupled to a ground voltage GND, a first unidirectional element D2 provided between the other terminal N2 of the first capacitor C2 and the ground voltage GND, and a second unidirectional element D3 provided between the other terminal N3 of the second capacitor C3 and the other terminal N2 of the first capacitor C2. A negative voltage is generated at the other terminal N3 of the second capacitor C3. In the example shown in FIG. 7, the first and second unidirectional elements D2, D3 are Schottky diodes.

As mentioned hereinabove, the first transistor M10 is a normally-on compound semiconductor (e.g. GaN) N channel HEMT that has a high breakthrough voltage and is switched at a high speed.

The step-up voltage regulator operates in the following manner. Where the first transistor M10 is switched on, a current flows in the path of the input voltage V1, inductor L10, and first transistor M10, the potential of the connection node SW drops close to the ground voltage, and electromagnetic energy is accumulated in the inductor L10. Where the first transistor M10 is then switched off, the potential of the connection node SW rises to become higher than the input voltage V1 under the effect of the electromagnetic energy accumulated in the inductor L1, a current flows in the path of the input voltage V1, inductor L10, diode D10, and output terminal VOUT, the output capacitor C1 is charged, and the potential of the output voltage VOUT becomes higher than the input voltage. The higher is the duty ratio at which the first transistor M10 is set on, the higher is the potential of the output voltage VOUT.

The operation of the negative voltage generation circuit 20 is similar to that illustrated by FIG. 2. Thus, the capacitor C2 is charged by the pulse signal of the connection node SW, the charged electric charge is transferred to the capacitor C3, and a negative voltage is generated at the terminal N3. In this case, a negative voltage is also generated on the basis of the pulse signal of the connection node SW where a large current is generated by the drive operation of the transistor M10. Therefore, sufficient negative voltage is generated.

The voltage regulator depicted in FIG. 7 is of a step-up type. For example, the input voltage V1 thereof is commercial power supply of 100 V and the output voltage VOUT is a high voltage of 200 V to 300 V. In this case, the voltage of the pulse signal generated in the connection node SW is also very high (200 V to 300 V). Accordingly, a negative voltage of −200 V to −300 V is obtained at the terminal N2, and the terminal N3 also has a similarly deep negative voltage. By contrast, when the first transistor M10 is a normally-on compound semiconductor HEMT, the threshold voltage is at most minus several volts. Therefore, a negative voltage of −200 V to −300 V is too low as a drive voltage.

Accordingly, the negative voltage generation circuit 20 illustrated by FIG. 7 further includes a clamp circuit having a Zener diode D4, a resistor R4, and a capacitor C4 between the terminal N3 and the ground voltage GND. Thus, when the voltage at the connection node SW drops from the H level to the vicinity of the ground voltage, the terminals N2, N3 drop to a deep negative potential, the Zener diode D4 becomes on in the reverse direction as the potential of the terminal N3 decreases, and the potential of the terminal N4 is clamped at a negative voltage corresponding to the negative threshold voltage of the HEMT. The capacitor C4 is charged at this clamp potential, and a negative voltage optimum as the drive voltage of the HEMT, for example −10 V, is generated at the terminal N4.

The unidirectional elements D2, D3 in the negative voltage generation circuit 20 depicted in FIG. 7 are for example Schottky diodes. Since the forward voltage thereof is lower than that of PN-junction diodes, the efficiency of the negative voltage generation circuit is increased accordingly.

The unidirectional elements D2, D3 may be those of Variation Examples 1, 2, and 3 of the first embodiment (FIGS. 4, 5, and 6), namely, those in which the drain and gate of a normally-on HEMT are coupled through a constant voltage or those in which the drain and gate of a normally-off HEMT are directly coupled to each other.

Figure 8:
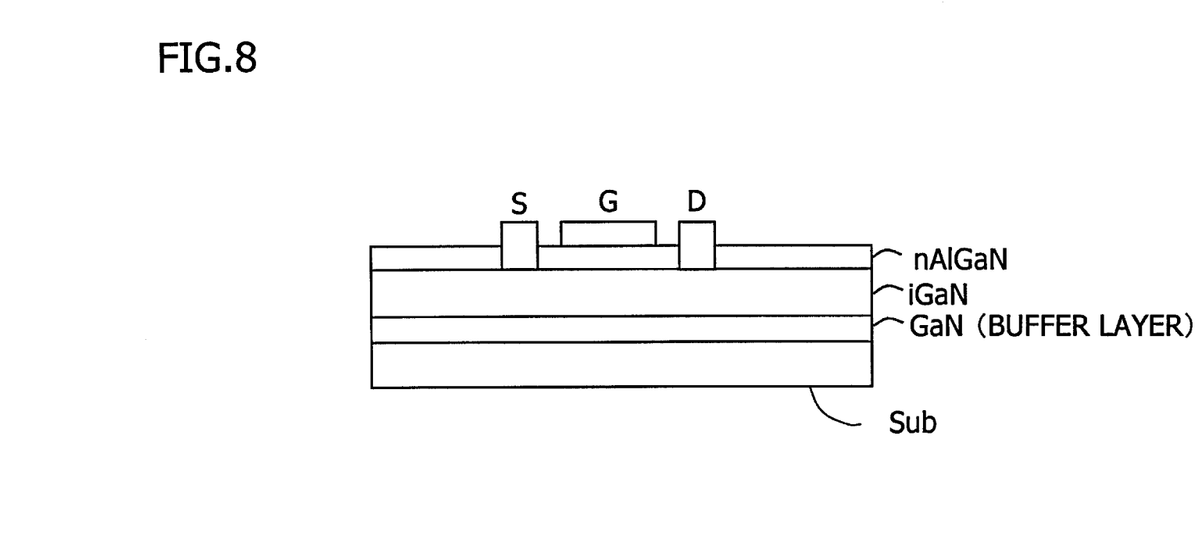
FIG. 8 illustrates a cross-sectional structure of a GaN compound semiconductor HEMT.

FIG. 8 illustrates a cross-sectional structure of a GaN compound semiconductor HEMT. In the HEMT, an electron transit layer constituted by i-type GaN and an electron supply layer constituted by a n-type AlGaN are formed on a semiconductor substrate SUB from Si or the like, with a GaN buffer layer being interposed therebetween, a gate electrode G is formed on the n-type AlGaN layer, and a source electrode S and a drain electrode D are formed inside the n-type AlGaN layer. A n-type GaN layer or an insulating film of silicon nitride (not shown) is formed on the n-type AlGaN layer.

Thus, the HEMT has no PN junction formed between the substrate and the source and drain, as in a power MOS transistor, and has no body diode. Therefore, the drain and gate can be coupled to obtain a unidirectional element. Further, since GaN is a wide band gap semiconductor, the breakthrough voltage is high, the distance between the source (drain) and the gate may be decreased and high-speed switching operation may be performed. In the voltage regulator of the above-described embodiment, where the first and second transistors M1, M2, M10 are constituted by such HEMT from GaN or the like, a high breakthrough voltage and high-speed switching can be realized and highly efficient voltage regulator can be obtained.

Further, HEMTs are mainly of a normally-on type, but in this case the drive signals of the transistors M1, M2, M10 is also controlled to a negative voltage and switching operation is performed by providing a negative voltage generation circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A voltage regulator, comprising:
a normally-on first transistor coupled to an input voltage;
an inductor provided between the first transistor and an output terminal;
a return circuit provided between a reference voltage and a connection node of the first transistor and the inductor;
a drive circuit that supplies a drive signal to a gate of the first transistor; and
a negative voltage generation circuit that is coupled to the reference voltage, generates a negative voltage on the basis of a pulse signal generated at the connection node by switching operation of the first transistor, and supplies the negative voltage to the drive circuit.

2. The voltage regulator according to claim 1, wherein the drive circuit generates a drive signal having the negative voltage.

3. The voltage regulator according to claim 1, wherein
the return circuit includes a second transistor which is provided between the connection node and the reference voltage and is supplied with a drive signal to a gate thereof from the drive circuit, and
the first and second transistors are alternately switched on and off in response to the drive pulse.

4. The voltage regulator according to claim 1, wherein
the negative voltage generation circuit includes a first capacitor coupled at one terminal thereof to the connection node, a second capacitor coupled at one terminal thereof to the reference voltage, a first unidirectional element provided between the other terminal of the first capacitor and the reference voltage, and a second unidirectional element provided between the other terminal of the second capacitor and the other terminal of the first capacitor, and the negative voltage is generated at the other terminal of the second capacitor.

5. A voltage regulator comprising:
an inductor coupled to an input voltage;
a unidirectional output element provided between the inductor and an output terminal;
a normally-on first transistor provided between a reference voltage and a connection node of the inductor and the unidirectional output element;
a drive circuit that supplies a drive signal to a gate of the first transistor; and
a negative voltage generation circuit that is coupled to the reference voltage, generates a negative voltage on the basis of a pulse signal generated at the connection node by switching operation of the first transistor, and supplies the negative voltage to the drive circuit.

6. The voltage regulator according to claim 5, wherein the drive circuit generates a drive pulse having the negative voltage.

7. The voltage regulator according to claim 5, wherein
the negative voltage generation circuit includes a first capacitor coupled at one terminal thereof to the connection node, a second capacitor coupled at one terminal thereof to the reference voltage, a first unidirectional element provided between the other terminal of the first capacitor and the reference voltage, and a second unidirectional element provided between the other terminal of the second capacitor and the other terminal of the first capacitor, and the negative voltage is generated at the other terminal of the second capacitor.

8. The voltage regulator according to claim 7, wherein the negative voltage generation circuit further comprises a clamp circuit that clamps to the negative voltage between the reference voltage and the other terminal of the second capacitor.

9. The voltage regulator according to claim 1, wherein the first transistor is a normally-on compound semiconductor high electron mobility transistor.

10. The voltage regulator according to claim 5, wherein the first transistor is a normally-on compound semiconductor high electron mobility transistor.

11. The voltage regulator according to claim 1, wherein the first and second unidirectional elements include a Schottky diode.

12. The voltage regulator according to claim 5, wherein the first and second unidirectional elements include a Schottky diode.

13. The voltage regulator according to claim 1, wherein the first and second unidirectional elements include a compound semiconductor high electron mobility transistor (HEMT) in which a gate and a drain are coupled.

14. The voltage regulator according to claim 5, wherein the first and second unidirectional elements include a compound semiconductor high electron mobility transistor (HEMT) in which a gate and a drain are coupled.

15. The voltage regulator according to claim 1, wherein the first and second unidirectional elements include a normally-on compound semiconductor high electron mobility transistor (HEMT) in which a constant voltage generation circuit is provided between a gate and a drain.

16. The voltage regulator according to claim 5, wherein the first and second unidirectional elements include a normally-on compound semiconductor high electron mobility transistor (HEMT) in which a constant voltage generation circuit is provided between a gate and a drain.

17. The voltage regulator according to claim 1, wherein the first and second unidirectional elements include a normally-off compound semiconductor high electron mobility transistor (HEMT) in which a constant voltage generation circuit is provided between a gate and a drain.

18. The voltage regulator according to claim 5, wherein the first and second unidirectional elements include a normally-off compound semiconductor high electron mobility transistor (HEMT) in which a constant voltage generation circuit is provided between a gate and a drain.

19. A drive method for a voltage regulator having a first transistor which intermittently supplies a current from an input voltage to an inductor, and a drive circuit which supplies a drive signal to a gate of the first transistor and on/off operates the first transistor,
the drive method comprising:
generating a negative voltage on the basis of a pulse signal generated at a connection node of the inductor and the first transistor by the on/off operation of the first transistor; supplying the negative voltage to the drive circuit; and switching off the first transistor by subjecting the drive signal to the negative voltage.

* * * * *